US 8,266,954 B2

(12) United States Patent
Toyofuku

(10) Patent No.: US 8,266,954 B2
(45) Date of Patent: Sep. 18, 2012

(54) TIRE PRESSURE INFORMATION MONITORING SYSTEM OPERATING WITH HIGH AND LOW FREQUENCY CLOCKS

(75) Inventor: Masanobu Toyofuku, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 385 days.

(21) Appl. No.: 12/598,851

(22) PCT Filed: May 7, 2008

(86) PCT No.: PCT/JP2008/058498
§ 371 (c)(1),
(2), (4) Date: Nov. 4, 2009

(87) PCT Pub. No.: WO2008/140003
PCT Pub. Date: Nov. 20, 2008

(65) Prior Publication Data
US 2010/0089140 A1    Apr. 15, 2010

(30) Foreign Application Priority Data
May 7, 2007    (JP) .................................. 2007-122744

(51) Int. Cl.
*B60C 23/02*    (2006.01)
(52) U.S. Cl. ......................................... 73/146.5; 73/146
(58) Field of Classification Search ........................ None
See application file for complete search history.

(56) References Cited

U.S. PATENT DOCUMENTS

| | | | |
|---|---|---|---|
| 6,271,748 B1 | 8/2001 | Derbyshire et al. | |
| 6,829,924 B2 * | 12/2004 | Nantz et al. ..................... | 73/146 |
| 6,906,624 B2 * | 6/2005 | McClelland et al. ......... | 340/442 |
| 7,088,226 B2 * | 8/2006 | McClelland et al. ......... | 340/442 |
| 7,113,083 B2 * | 9/2006 | Suitsu ........................... | 340/442 |
| 7,132,939 B2 * | 11/2006 | Tyndall et al. ................ | 340/447 |
| 7,391,308 B2 * | 6/2008 | Iwazumi ....................... | 340/442 |
| 2006/0041344 A1 | 2/2006 | Ooba | |

FOREIGN PATENT DOCUMENTS

| | | |
|---|---|---|
| CN | 1730303 A | 2/2006 |
| JP | 10-504783 A | 5/1998 |

(Continued)

OTHER PUBLICATIONS

International Search Report dated Aug. 6, 2008 (4 pages).

(Continued)

*Primary Examiner* — Lisa Caputo
*Assistant Examiner* — Jermaine Jenkins
(74) *Attorney, Agent, or Firm* — Sughrue Mion, PLLC

(57) ABSTRACT

A tire pressure information monitoring system includes a pressure sensor (24) for detecting air pressure within a tire, and a temperature sensor (25) for detecting temperature within the tire. The monitoring system further includes a CPU (21) that operates with a high frequency clock to send command to the pressure sensor (24) and the temperature sensor (25) to acquire internal information of the tire, and thereafter operates with a low frequency clock until stabilizing time of the pressure sensor (24) and the temperature sensor (25) elapses. The CPU then operates with a high frequency clock to transmit the internal information of the tire, which has been acquired by the pressure sensor (24) and the temperature sensor (25), to an external receiver at a constant time interval, and thereafter operates with a low frequency clock until the constant time interval elapses.

3 Claims, 6 Drawing Sheets

FOREIGN PATENT DOCUMENTS

| | | |
|---|---|---|
| JP | 2004-9923 A | 1/2004 |
| JP | 2003-314727 A | 11/2004 |
| JP | 2004-314727 A | 11/2004 |
| JP | 2004-322927 A | 11/2004 |
| JP | 2006-1431 A | 1/2006 |
| WO | 0207993 A2 | 1/2002 |

OTHER PUBLICATIONS

Chinese Office Action dated Apr. 8, 2011, corresponding to Chinese Application No. 200880015281.0.

Canadian Office Action issued in Application No. 2686090 dated Jan. 17, 2012.

* cited by examiner

TIRE PRESSURE INFORMATION MONITORING SYSTEM OPERATING WITH HIGH AND LOW FREQUENCY CLOCKS

TECHNICAL FIELD

The present invention relates to a tire pressure information monitoring system for measuring the internal pressure, etc., of a tire, and transmitting the acquired data to a receiver on a vehicle body side by wireless communication.

BACKGROUND ART

There has been recently proposed to provide a vehicle with a tire pressure monitoring system (TPMS), as means for monitoring whether the air pressure filling a tire (internal pressure) is normal or abnormal. In this instance, a sensor module for measuring the internal pressure or internal temperature of the tire, etc., is provided inside the tire. The measured data is transmitted from the sensor module by wireless communication and received by a receiver on a vehicle body side, so that the received data is displayed by an on-board display device in a driver's cabin.

In this type of tire pressure monitoring system, the sensor module provided within a tire is usually driven by battery. Thus, if the battery is exhausted and becomes unable to operate, it is impossible for the sensor module to transmit the measured data of the tire to the receiver on the vehicle body side. Therefore, it is highly desirable to suppress the electric power consumption of the battery for the sensor module as far as possible, and various proposals have been made to that end.

Patent Document 1 discloses a tire information acquisition system having a measuring/transmitting mode in which the measurement and data transmission are performed at a constant time interval, and a sleeping mode wherein the processing and transmission are halted. Also, Patent Document 2 discloses a tire pressure monitoring system that is switched into a low power consumption mode in a parking state of the vehicle.

[Patent Document 1] JP 2004-314727A
[Patent Document 2] JP 2004-322927A

DISCLOSURE OF THE INVENTION (Task to be Solved by the Invention)

As explained above, in conventional sensor modules, tire information (temperature and/or pressure) is periodically read out from the pressure sensor and/or temperature sensor, and converted into a digital wireless signal together with an identification code ID so as to be transmitted to the receiver on the vehicle body side. In this instance, the signal processing and/or control of the operation generally performed by an internal CPU that constitutes the sensor module. When a measuring command is transmitted from the CPU to the pressure sensor and/or temperature sensor, several microseconds are necessary until the pressure sensor and/or temperature sensor are stabilized. During such a period, the CPU assumes a waiting mode until the stabilizing time elapses, without lowering the clock frequency. Also, when transmitting the measured data to the receiver on the vehicle body side, the CPU performs transmission of the measured data to the receiver periodically at a constant transmission time interval. However, between the successive transmissions, the CPU assumes a waiting mode without lowering the clock frequency.

FIG. 6 is a flowchart that explains an example of operation of the CPU in a conventional sensor module. It can be seen that the CPU sends a measuring command to the pressure sensor and waits until the pressure sensor is stabilized, before reading out the pressure data. Then, the CPU sends a measuring command to the temperature sensor, and waits until the temperature sensor is stabilized, before reading out the temperature data. Subsequently, the CPU converts the pressure data and the temperature data into a digital data, which is transmitted to the receiver on the vehicle body side. The CPU then wait until the transmission time interval elapses and transmits the digitized measured data to the receiver on the vehicle body side again. After repeating the transmission of the measured data by a desired number of times, the CPU terminates the transmission processing and is switched into a sleeping mode by lowering the clock frequency. Thus, as explained above, there is a problem that, even during the waiting period of the CPU in which essentially no processing is performed, the CPU is not switched into the sleeping mode and continues to consume unnecessary electric power.

The present invention has been made in view of these problems of the prior art. It is an objection of the present invention to provide an improved an improved tire pressure information monitoring system allowing extension of the battery life by suppressing unnecessary electric power consumption in the waiting mode of the CPU.

(Means for Solving the Task)

To achieve the above-mentioned object, according to one aspect of the present invention, there is provided a tire pressure information monitoring system including a sensor for acquiring internal information of a tire, and operating with a low frequency clock and/or a high frequency clock; wherein the monitoring system operates with the high frequency clock, to transmit a command signal to the sensor to acquire the tire internal information; and wherein the monitoring system thereafter operates with the low frequency clock. According to another aspect of the present invention, there is provided a tire pressure information monitoring system including a sensor for acquiring internal information of a tire, and operating with a low frequency clock and/or a high frequency clock; wherein the monitoring system operates with the high frequency clock, to transmit the tire internal information acquired by the sensor to an external receiver means at a constant time interval; and wherein the monitoring system operates, after transmission of the tire internal information, with the low frequency clock until expiration of said time interval. In either case, it is preferred that the sensor is one of a pressure sensor and a temperature sensor.

(Effects of the Invention)

According to the present invention, when the CPU is assuming a waiting mode essentially without performing any processing, it is switched into a sleeping mode to suppress unnecessary electric power consumption, thereby allowing extension of the battery life.

REFERENCE NUMERALS

Figure 1:
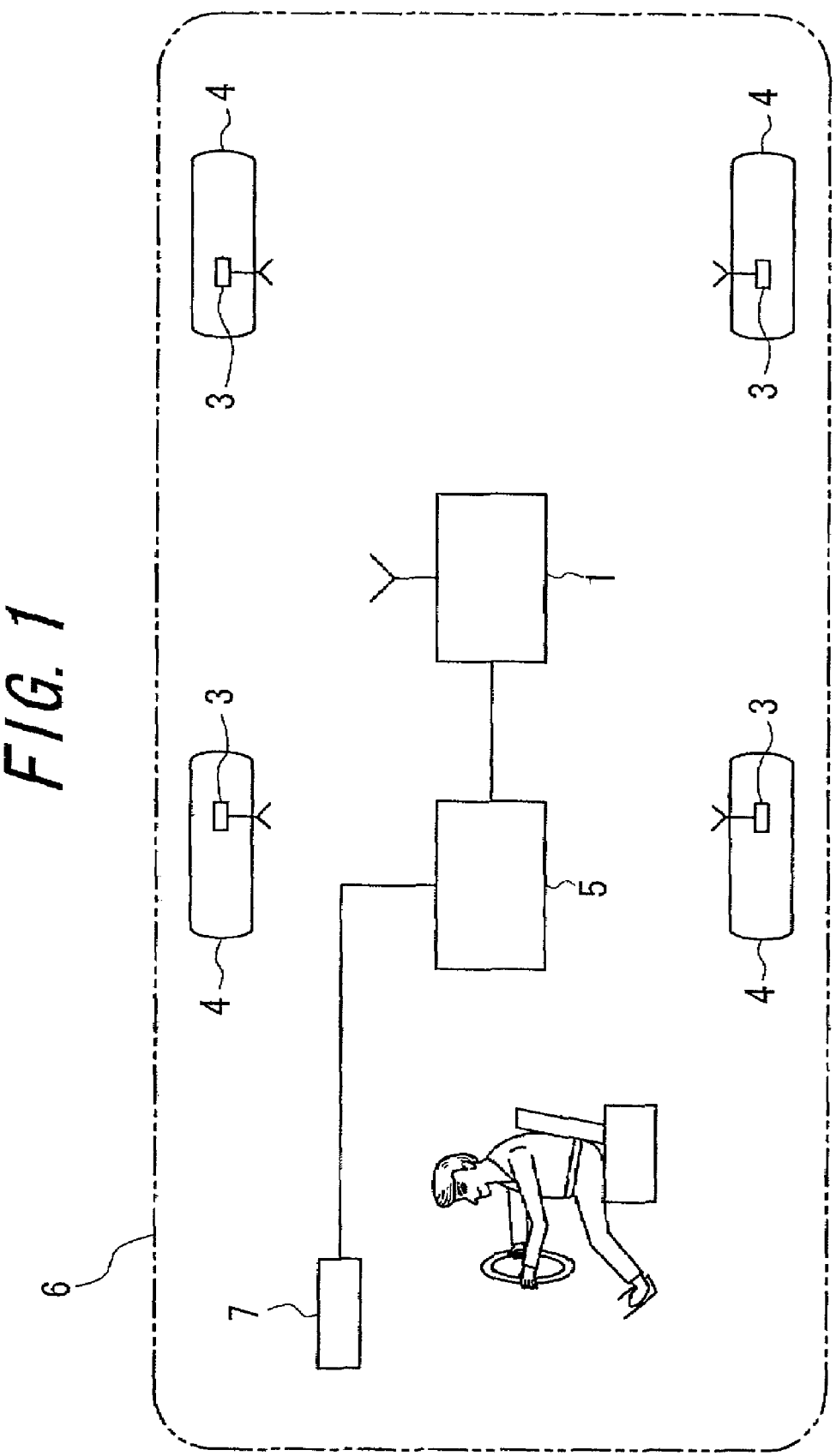
FIG. 1 is a block diagram of a tire pressure monitoring system to which the sensor module according to present invention is applied.

1: Receiver
3: Sensor modules
4: Wheels
5: Electronic control unit (ECU)
6: Vehicle
7: Display device
11: Tire
12: Tire valve
13: Wheel rim
15: Sensor module main body
16: Rim mounting portion
17: Antenna
21: CPU
22: Transmitter
23: Selector
24: Pressure sensor
25: Temperature sensor
26: First timer circuit
27: Second timer circuit
28: Third timer circuit
29: Battery

BEST MODE FOR CARRYING OUT THE INVENTION

A preferred embodiment of the present invention will be explained below with reference to the drawings. FIG. 1 is a block diagram of a tire pressure monitoring system to which the sensor module (tire pressure measuring device) according to present invention is applied. The tire pressure monitoring system is mounted on a vehicle 6 as being secured to each wheel 4 of the vehicle 6, and includes a sensor module 3 for measuring the pressure or temperature within a tire of the wheel 4 and transmitting the measured pressure data or temperature data to the vehicle body side, a receiver 1 for receiving the pressure data or temperature data transmitted from an antenna of the sensor module 3 by wireless communication, a vehicle-mounted controller in the form of an electronic control unit (ECU) 5 for acquiring the pressure data or temperature data from the receiver 1 and judging abnormality of the pressure data or temperature data for each mounting position of the tire, and a display device 7 mounted in a driver's cabin and displaying, for each mounting position of the tire, that the pressure or temperature within the tire is abnormal when it has been so judged by the electronic control unit 5.

The sensor module 3 serves to acquire tire internal information, such as tire pressure or tire temperature, at a predetermined time interval, and to transmit the information to the receiver 1 on the vehicle body side by wireless communication. Further, the electronic control unit 5 stores a correspondence table which memorizes the correspondence between the tire mounting positions and identification codes unique to the sensor modules 3. The measured data signal transmitted from the sensor module 3 is added with a sensor identification code. Thus, by checking whether the transmitted identification code matches with that stored in the correspondence table, the electronic control unit 5 judges the position where the tire is mounted, and determines the tire for which a warning is to be issued.

Figure 2:
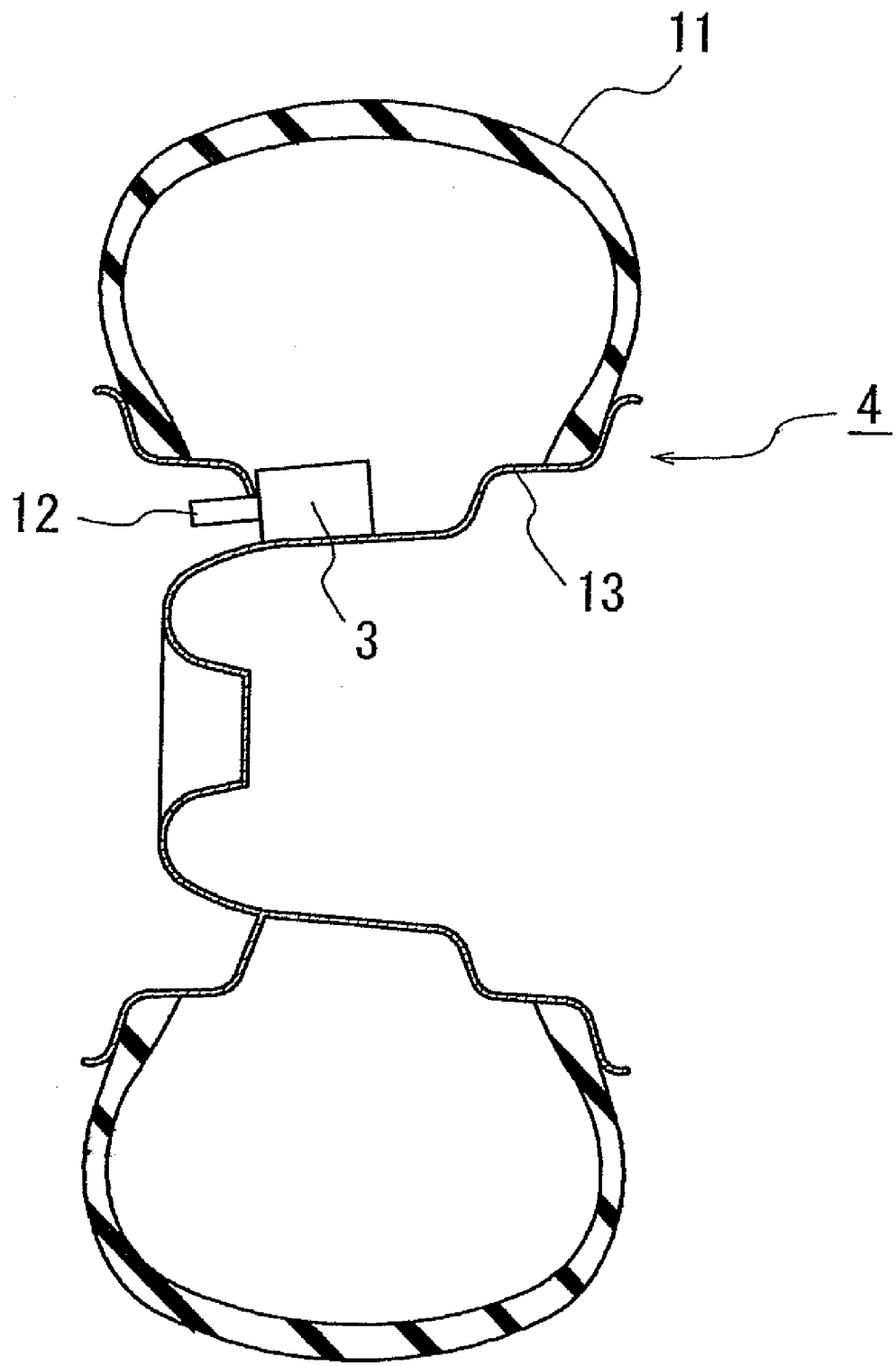
FIG. 2 is a sectional view showing an installation state of the sensor module to the vehicle wheel.

As can be appreciated from FIG. 2 showing the sectional view of the wheel, the sensor module 3 is secured to a wheel rim 13 as being integrated with a substantially cylindrical tire valve 12 for supplying air to a tire 11. The sensor module 3 may be secured to the inner surface of the tire 11 by baking so that it is prevented from separation from the tire or breakage upon deformation of the tire during running under a loaded condition. Alternatively, the sensor module 3 may be held in the interior space of the tire 11 by a separate holding means.

Figure 3:
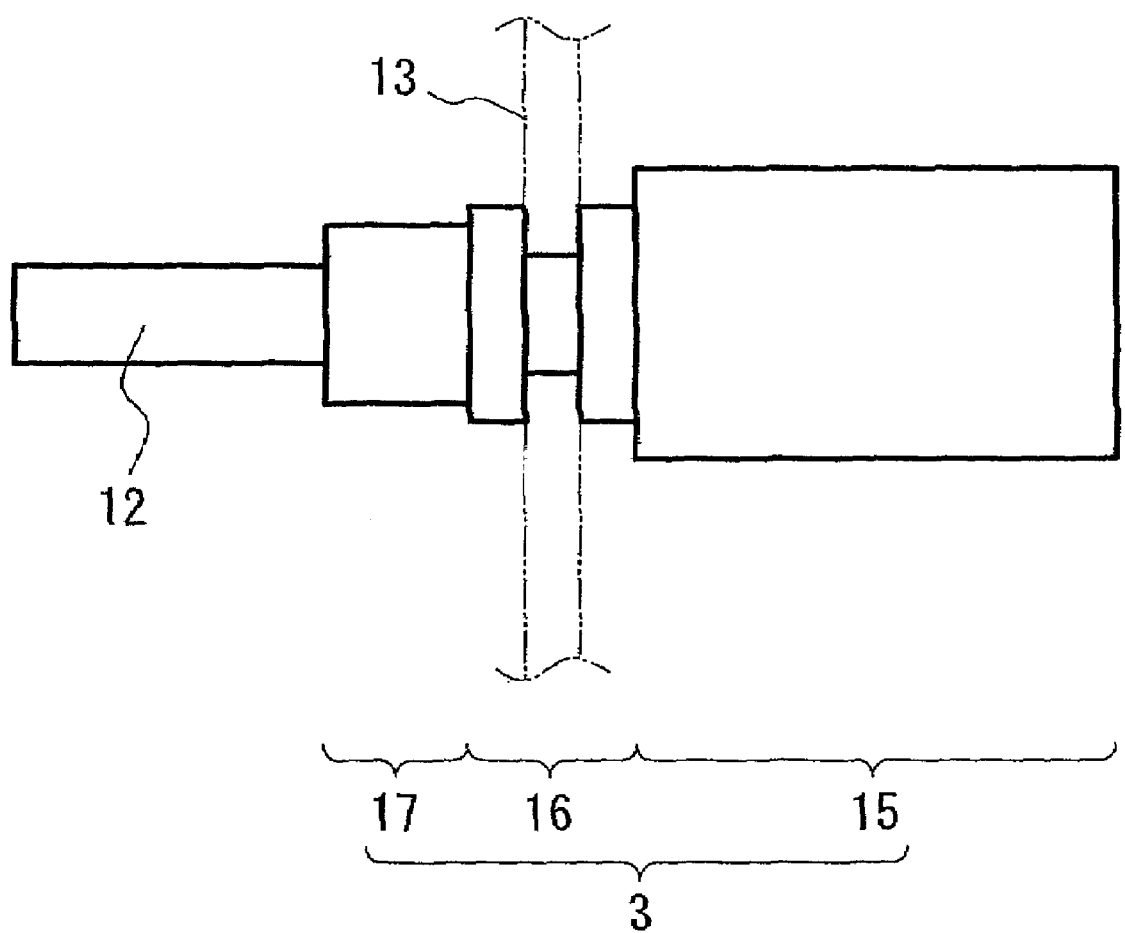
FIG. 3 is a view showing the outer shape of the sensor module.

FIG. 3 shows an example of the outer shape of the sensor module. It can be seen that the sensor module 3 includes a sensor module main body 15, a rim-mounting portion 16 and an antenna 17, and is secured to the wheel rim 13 as being integrated with the tire valve 12.

Figure 4:
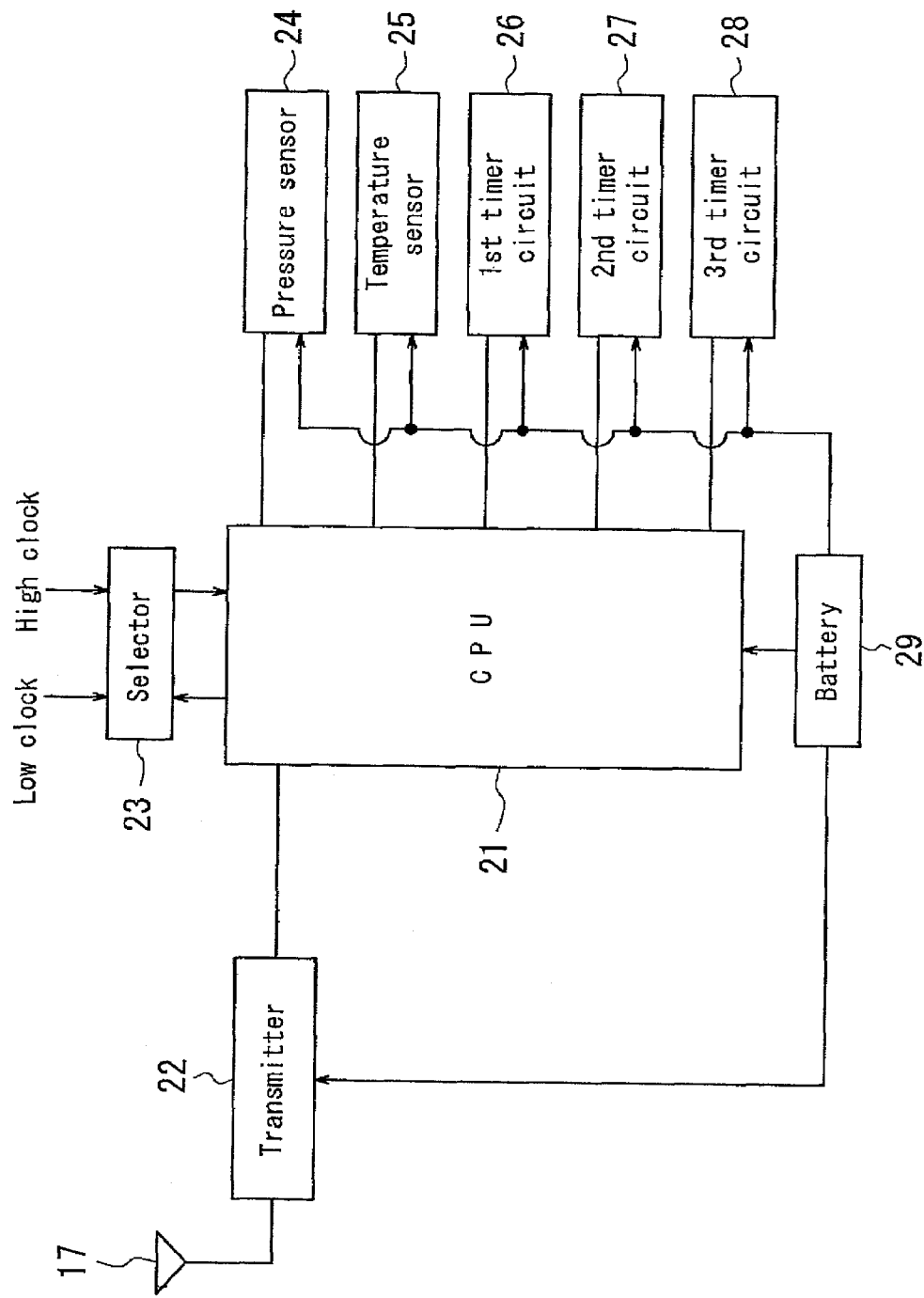
FIG. 4 is a schematic block diagram of the sensor module main body

The sensor module main body 15 includes an internal electric circuit device as shown by the schematic block diagram of FIG. 4. This electric circuit device includes a pressure sensor 24 for detecting the air pressure within the tire, a temperature sensor 25 for detecting the temperature within the tire, a CPU 21 for performing signal processing and controlling the operation of the electric circuit device, a transmitter 22 for transmitting the signal from the CPU 21 to the receiver on the vehicle body side via the antenna 17, a first timer circuit 26 for counting the stabilizing time of the pressure sensor 24, a second timer circuit 27 for counting the stabilizing time of the temperature sensor 25, a third timer circuit 28 for counting the transmission time interval of the measured data to the receiver, a selector 23 for selecting either a low frequency clock or a high frequency clock for driving the CPU 21, and a battery 29 for supplying electric power to the components of the electric circuit device. Incidentally, the temperature sensor 25 serves to provide a warning to the driver based on more detailed information relating to the status of the tire internal space. As such, the temperature sensor 25 is preferably included in the system, though it is not necessarily an indispensable element.

Figure 5:
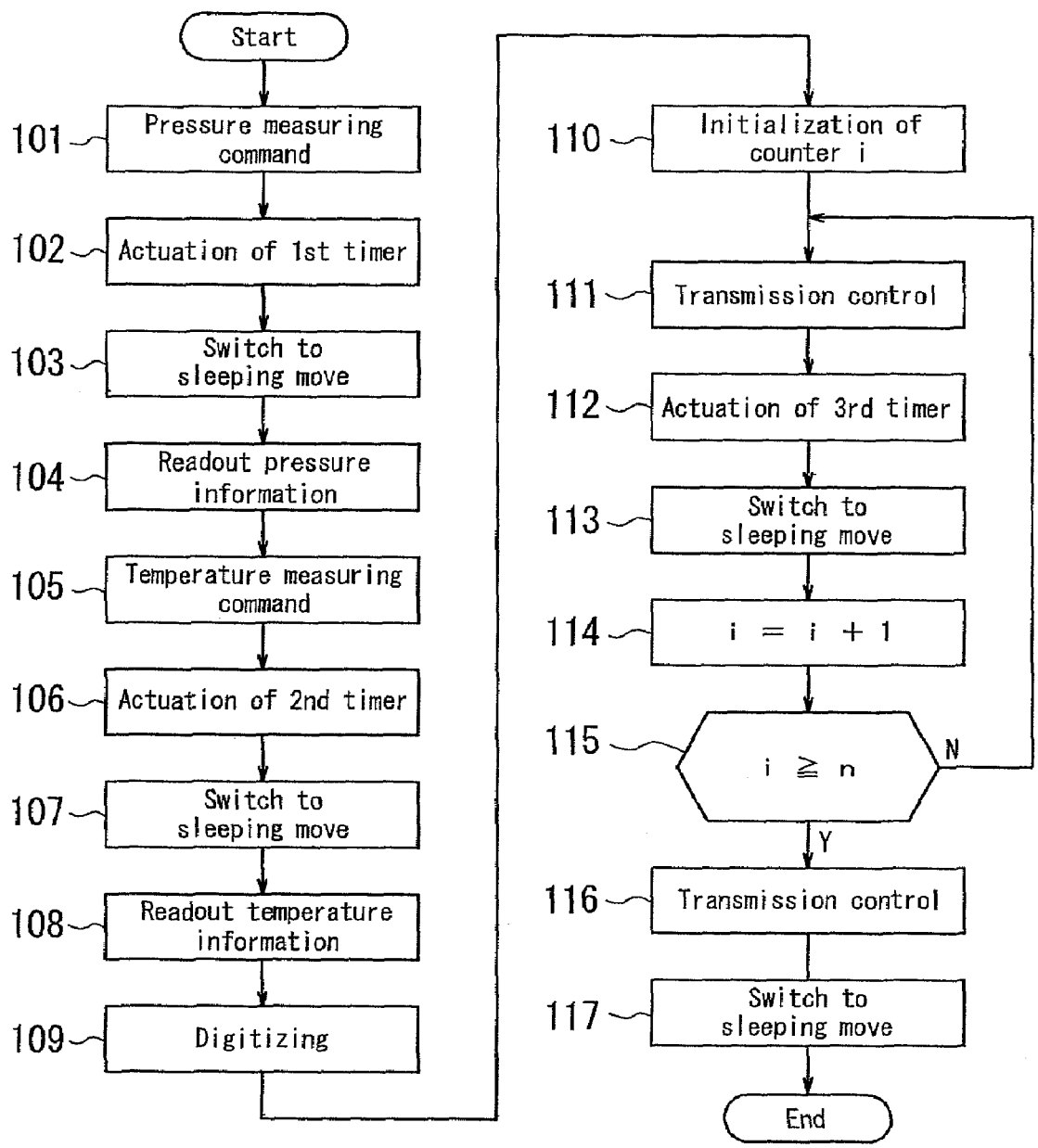
FIG. 5 is a processing flowchart explaining the operation of a CPU.
Figure 6:
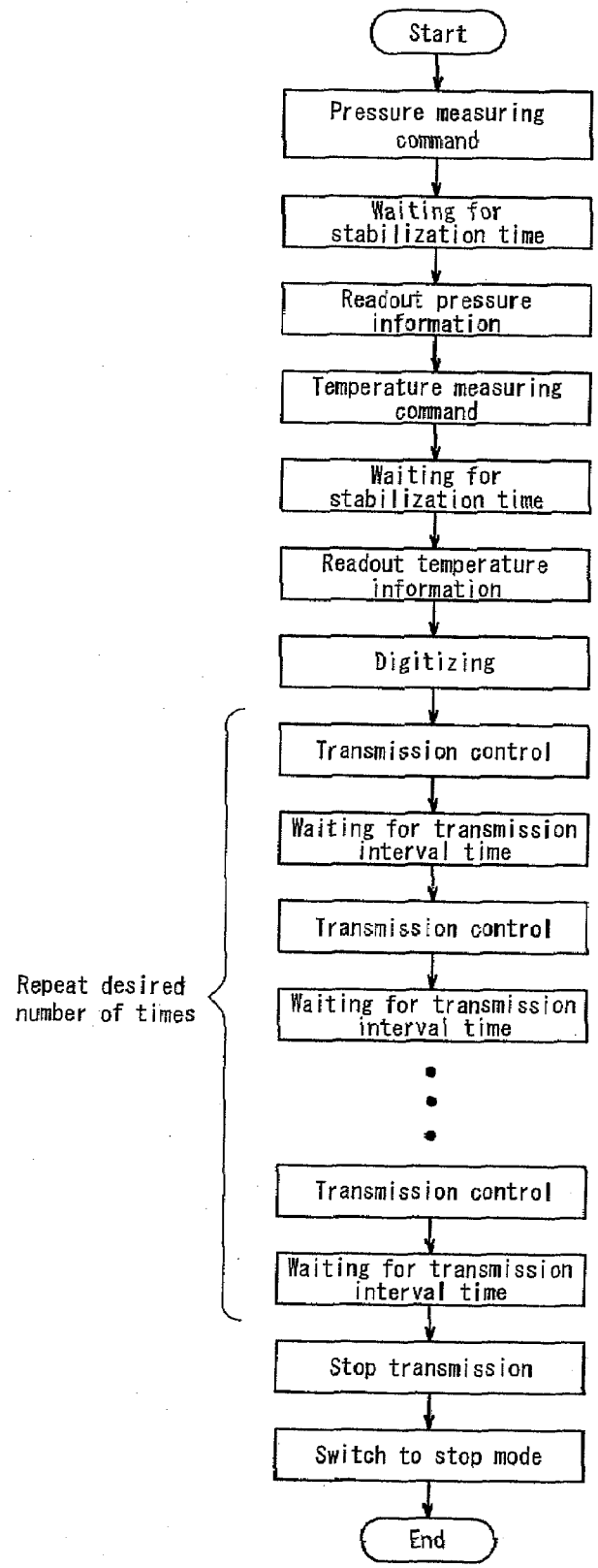
FIG. 6 is a processing flowchart explaining one example of the operation of a conventional CPU.

FIG. 5 is a processing flowchart explaining the operation of the CPU 21. When a predetermined timing is reached, the CPU 21 operates with a high frequency clock to send a measuring command to the pressure sensor 24 (step 101). After sending the measuring command to the pressure sensor 24, the CPU 21 causes the first timer circuit 26 to begin counting (step 102). Subsequently, the CPU 21 switches the selector 23 to the low frequency clock side and thereby selects the sleeping mode, i.e., the low power consumption mode (step 103). The first timer circuit 26 is set to a time required for stabilizing the measuring operation of the pressure sensor 24. When the counting by the first timer circuit 26 is completed, the CPU 21 switches the selector 23 to the high frequency clock side so that the CPU operates with the high frequency clock to perform reading of the pressure information (pressure data) from the pressure sensor 24 (step 104).

The CPU 21 then sends a measuring command to the temperature sensor 25 (step 105). After sending the measuring command to the temperature sensor 25, the CPU 21 causes the second timer circuit 27 to begin counting (step 106). Subsequently, the CPU 21 switches the selector 23 to the low frequency clock side and thereby selects the sleeping mode, i.e., the low power consumption mode (step 107). The second timer circuit 27 is set to a time required for stabilizing the measuring operation of the temperature sensor 25. When the counting by the second timer circuit 27 is completed, the CPU 21 switches the selector 23 to the high frequency clock side so that the CPU operates with the high frequency clock to perform reading of the temperature information (temperature data) from the temperature sensor 25 (step 108). Then, the CPU 21 performs digital conversion of the acquired pressure information (pressure data) and the temperature information (temperature data) and adds an identification code unique to the sensor module 3 to generate a digital signal (step 109).

Subsequently, the CPU initializes a counter i (not shown) (step 110) and transmits the digital signal including the pressure information (pressure data) and the temperature information (temperature data), from the transmitter 22 to the receiver on the vehicle body side, via the antenna 17 (step 111). When the digital signal has been transmitted, the CPU 21 causes the third timer circuit 28 to count (step 112) and then switches the selector 23 to the low frequency clock side so that the CPU is switched to the sleeping mode (low power consumption mode) until a predetermined time interval elapses (step 113). The third timer circuit 28 is set to a time until a next transmission is performed (predetermined time interval). When the counting by the third timer circuit 28 is completed, the CPU 21 increments the counter i and judges whether the incremented counter i is not smaller than n (e.g., n=10) (step 115). If the counter i is smaller than n, then the processing is returned to step 111.

The CPU 21 then switches the selector 23 to the high frequency clock side and operates with the high frequency clock to transmit the digital signal including the pressure information (pressure data) and the temperature information (temperature data), from the transmitter 22 to the receiver on the vehicle body side, via the antenna 17 (step 111). When the digital signal has been transmitted, the CPU 21 causes the third timer circuit 28 to count (step 112) and then switches the selector 23 to the low frequency clock side so that the CPU is switched to the sleeping mode (low power consumption mode) until a predetermined time interval elapses (step 113).

In this way, the steps 111 to 114 are repeated a plurality of times (n times). If it is judged in step 115 that the counter i is not smaller than n, the CPU 21 switches the selector 23 to the high frequency clock side and operates with the high frequency clock to transmit the digital signal including the pressure information (pressure data) and the temperature information (temperature data), from the transmitter 22 to an external receiver via the antenna (step 116). Then, the CPU 21 switches the selector 23 to the low frequency clock side and thereby selects the sleeping mode (the low power consumption mode) to terminate the processing (step 117).

Incidentally, in the embodiment shown in FIG. 5, the CPU 21 sends a measuring command to the pressure sensor 24 to acquire the pressure data, before sending a measuring command to the temperature sensor 25 to acquire the temperature data. However, the sequence may be reversed, i.e., the CPU 21 may send a measuring command to the temperature sensor 25 to acquire the temperature data, before sending a measuring command to the pressure sensor 24 to acquire the pressure data. Also, the CPU 21 may send a measuring command to any one of the sensors to acquire the tire internal information.

Furthermore, the CPU 21 may perform a series of processing (steps 101 to 104) for ends a measuring command to the pressure sensor 24 to acquire the pressure data for sending a measuring command to the pressure sensor 24 and acquiring the pressure data, and a series of processing sending a measuring command to the pressure sensor 24 and acquiring the pressure data, separately from each other. In this instance, the acquired pressure data and temperature data may be stored in a memory within the sensor module main body 15, to perform the transmission processing following the step 111 at a predetermined time interval so as to transmit the measured data to the receiver on the vehicle body side.

It will be appreciated from the foregoing description that, according to the present invention, when the CPU assumes a waiting mode essentially without performing any processing, it is switched into a sleeping mode to suppress unnecessary electric power consumption, thereby allowing extension of the battery life.

The invention claimed is:

1. A tire pressure information monitoring system including a sensor for acquiring internal information of a tire, and operating with a low frequency clock and/or a high frequency clock, wherein:
   said monitoring system operates with the high frequency clock, to transmit a command signal to the sensor to acquire the tire internal information; and
   said monitoring system thereafter operates with the low frequency clock.

2. The tire pressure information monitoring system according to claim 1, wherein the sensor is one of a pressure sensor and a temperature sensor.

3. The tire pressure information monitoring system according to claim 1, wherein the monitoring system operates with the low frequency clock for a period of time after said command signal is transmitted to said sensor until said sensor is stabilized to acquire the internal information of the tire, and
   wherein the monitoring system operates with the high frequency clock during reading out of the internal information of the tire from the sensor.

\* \* \* \* \*